No. 672,091. Patented Apr. 16, 1901.
E. J. CANTWELL.
HORSE HAY RAKE.
(Application filed Jan. 11, 1901.)
(No Model.) 2 Sheets—Sheet 1.
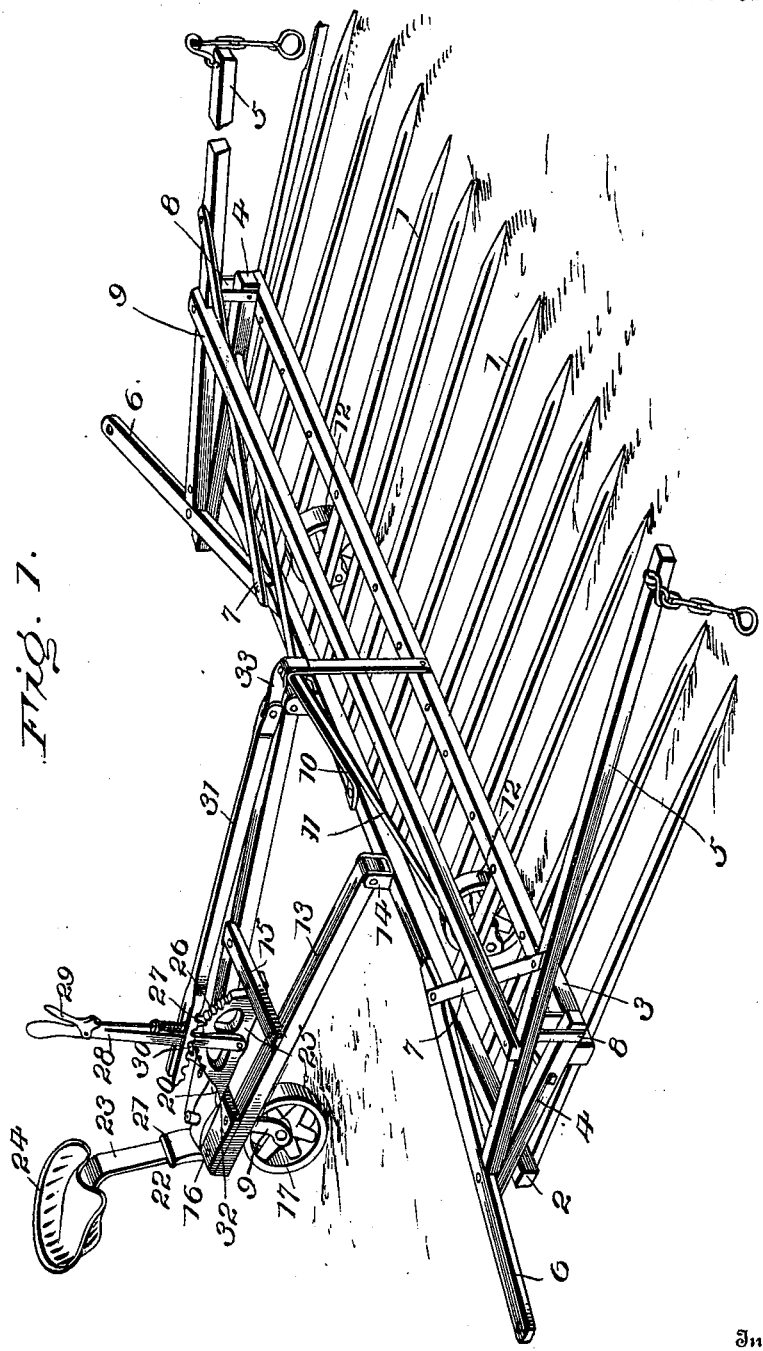
Witnesses
Inventor
Edward J. Cantwell No. 672,091. Patented Apr. 16, 1901.
E. J. CANTWELL.
HORSE HAY RAKE.
(Application filed Jan. 11, 1901.)
(No Model.) 2 Sheets—Sheet 2.
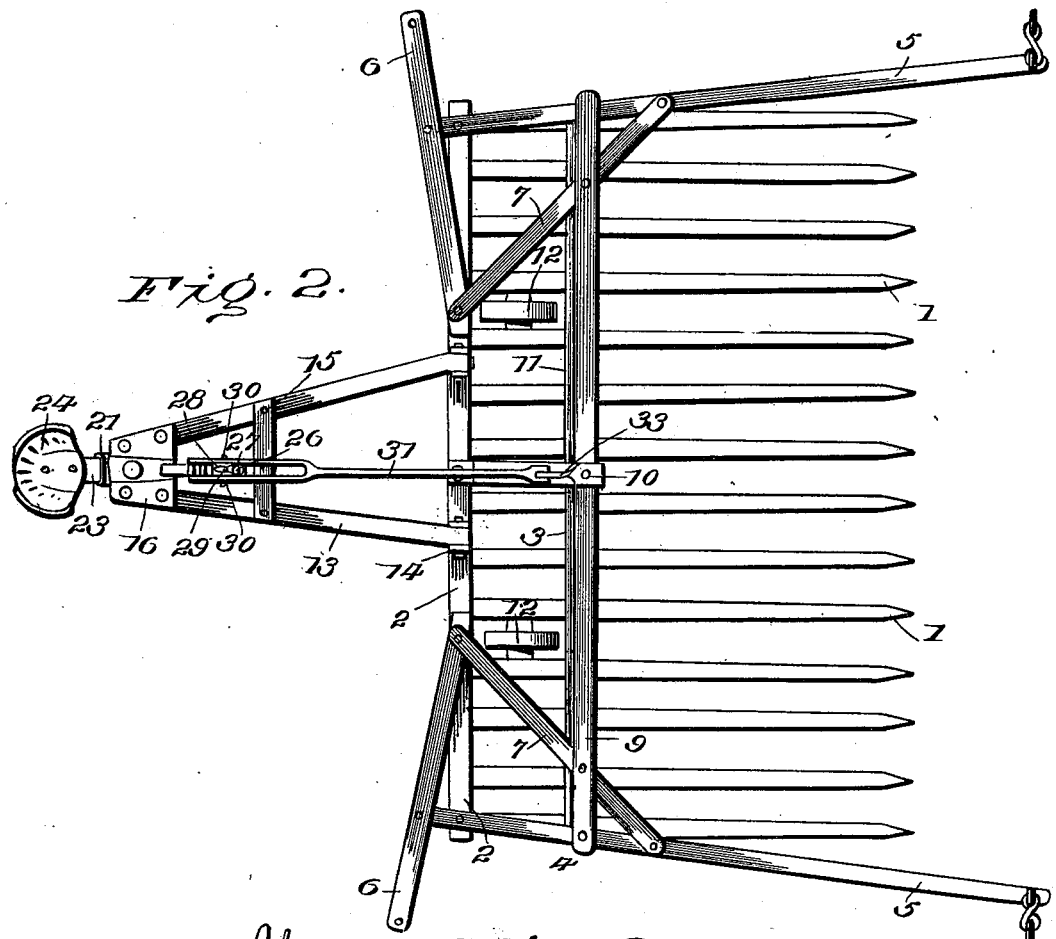
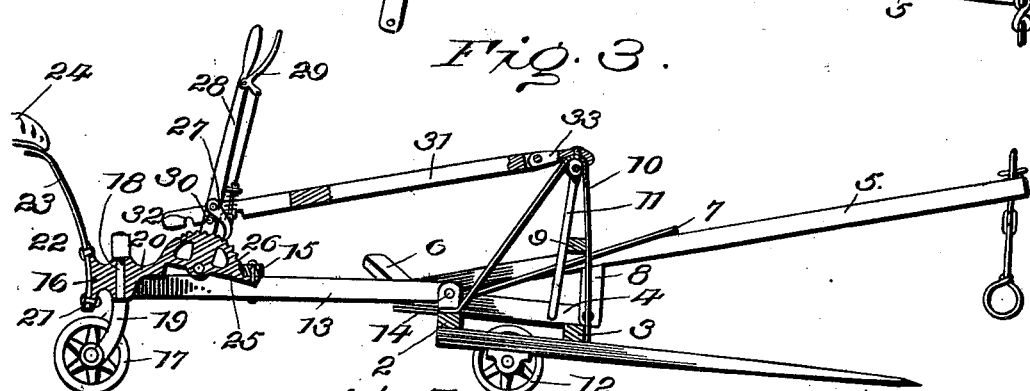
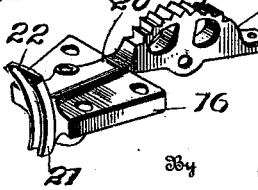
Witnesses
Jno Imirie
Gladys L. Thompson
Inventor
Edward J. Cantwell.
By R. S. & A. B. Lacey, Attorneys
THE NORRIS PETERS CO., PHOTO-LITHO., WASHINGTON, D. C.

UNITED STATES PATENT OFFICE.

EDWARD J. CANTWELL, OF NEW BOSTON, MISSOURI.

HORSE HAY-RAKE.

SPECIFICATION forming part of Letters Patent No. 672,091, dated April 16, 1901.

Application filed January 11, 1901. Serial No. 42,917. (No model.)

*To all whom it may concern:*

Be it known that I, EDWARD J. CANTWELL, a citizen of the United States, residing at New Boston, in the county of Linn and State of Missouri, have invented certain new and useful Improvements in Horse Hay-Rakes; and I do hereby declare the following to be a full, clear, and exact description of the invention, such as will enable others skilled in the art to which it appertains to make and use the same.

This invention has relation to the class of farming implements generally known as "horse hay-rakes," and has for its object to improve the general construction, to render more durable, and to increase the efficiency of this type of machines.

The invention will be set forth in detail hereinafter; and it consists of the novel features and combinations of parts more fully pointed out in the subjoined claim and illustrated in the drawings hereto attached and forming a part of the specification.

Figure 1 is a perspective view of a horse hay-rake embodying the invention. Fig. 2 is a top plan view thereof. Fig. 3 is a central longitudinal section. Fig. 4 is a detail perspective view of the casting applied to the riding attachment for supporting the caster, the seat, and the adjusting-lever.

Corresponding and like parts are referred to in the following description and indicated in all the views of the drawings by the same reference characters.

The rake consists of teeth 1 and a head composed of spaced bars 2 and 3. Longitudinal bars 4 connect the bars 2 and 3 at their ends and support the poles 5 and the lateral draft-bars 6. The poles 5 incline forwardly and laterally and are connected at their rear ends to the rake-head and are strengthened by braces 7, attached to the bar 2 a short distance from its outer end and connected to the poles 5 a short distance in advance of the rake-head. The draft-bars 6 project laterally from the poles 5, and the animals are hitched thereto and to the poles in the usual manner, one being at each side or end of the rake. Vertical stays 8 are interposed between the front ends of the bars 4 and the poles to enable a firm connection being had between said poles and the rake. A cross-bar 9, parallel with the bar 3 and arranged directly thereabove, connects the poles 5 a short distance from their rear ends and serves to brace them laterally and to stiffen the rake. A standard 10, located centrally of the rake and composed of a bar of metal bent into an inverted-V form, is secured at its ends to the bars 2 and 3 and has the central portion of a truss-brace 11 connected thereto, the extremities of said truss-brace being attached to the bars 4. This construction prevents the sagging of the end portions of the rake when loaded and enables lighter material than generally employed to be utilized in its construction, which is of material advantage.

The rake is supported upon ground-wheels 12, mounted upon axles supported in bearings attached to adjacent teeth 1.

The riding attachment consists of a frame composed of rearwardly-convergent bars 13, pivotally connected at their front ends to clips 14, attached to the bar 2 of the rake-head, and these bars 13 are connected by a cross-bar 15 and a plate 16 and are supported at their rear ends by a caster-wheel 17, having the stem 18 of its frame 19 journaled vertically in the opening formed in the plate 16. The central portion of the plate 16 is reinforced by a longitudinal rib 20 and with upper and lower enlargements or bosses in which the stem 18 is journaled. An upright extension 21 is formed at the rear end of the plate 16, curves in the direction of its length, and is formed in its rear side with a recess or seat 22 to receive the lower end of a standard 23, carrying the driver's seat 24. A segment 25 is projected forward from the plate 16 and is attached at its front end to the cross-bar 15, and its upper or curved edge is toothed, as shown at 26, to coöperate with a pawl 27, applied to the operating-lever 28, and is controlled by means of a hand-latch 29. This lever 28 is pivoted at its lower end to the segment 25 and is provided near its lower end with a transverse pin 30, whose ends project to make detachable connection with the rear end of a connecting-rod 31 between the lever 28 and the rake, whereby the latter is turned upon the axles of the ground-wheels 12, so as to raise and lower the forward ends of the teeth 1, as may be required. The rear end of the bar 31 is cleft or forked and embraces the sides of the lever 28, and the lower edge of the fork members is notched, as shown at 32, to make detachable and adjustable connection with the projecting ends of the pins 30. The forward end of the bar 31 is pivotally connected to a clevis 33, attached to the upper end of the standard 10. The upper end of the lever 28 is within convenient reach of the driver's seat 24, and by moving the same forward or backward the front ends of the rake-teeth 1 may be raised or lowered, and the elevation of said rake-teeth may be effected by engagement of the pawl 27 with the teeth 26 of the segment 25. By changing the connection of the lever 28 with the rod 31 the front ends of the teeth 1 of the rake may be elevated to a higher point upon moving the free end of the said lever 28 rearward to a given position. This construction also admits of the free end of the lever 28 occupying a given position and the front ends of the rake-teeth 1 being raised more or less, as may be required.

The plate 16, segment 25, and rear curved extension 21 are parts of an integral casting, thereby obviating the formation of joints and materially simplifying and cheapening the construction, besides forming a substantial support for the seat, caster-wheel, and the operating-lever, as well as strengthening and bracing the frame of the riding attachment.

Having thus described the invention, what is claimed as new is—

In a horse hay-rake, and in combination with the rake proper, a riding attachment comprising rearwardly-convergent bars, a cross-bar and a casting, the latter consisting of a plate, a forwardly-extending toothed segment, and a rear upright extension, a caster-wheel having the shank of its frame journaled vertically in said plate, a seat having its standard connected to the upright extension of the casting, an operating-lever pivoted to the segment of said casting and provided with a hand-latch and pawl to coöperate with the teeth thereof, and a connecting-bar between the rake and lever, substantially as specified.

In testimony whereof I affix my signature in presence of two witnesses.

EDWARD J. CANTWELL. [L. S.]

Witnesses:
F. G. FORREST,
JOHN C. PARK.